UNITED STATES PATENT OFFICE.

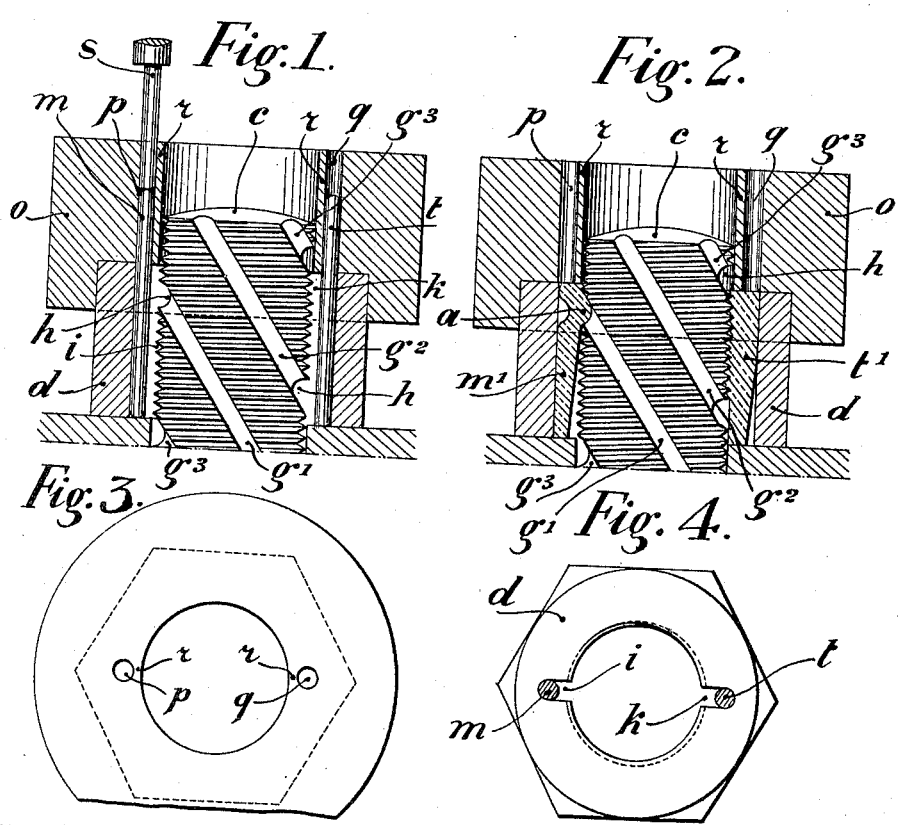

LOUIS ANTOINE GARCHEY, OF PARIS, FRANCE.

NUT-LOCK.

1,036,825.

Specification of Letters Patent.  Patented Aug. 27, 1912.

Application filed May 1, 1911. Serial No. 624,312.

*To all whom it may concern:*

Be it known that I, LOUIS ANTOINE GARCHEY, a citizen of the French Republic, residing at Paris, Republic of France, have invented certain new and useful Improvements in Nut-Locks, of which the following is a specification.

The problem to prevent the getting loose of nuts on bolts has not yet been solved in a satisfactory manner. The two principal reasons for which all solutions of the problem hitherto proposed have been rejected are: (1) that the locking devices always necessitate the use of a separate organ either in connection with the screw bolt or with the nut for effectually locking the nut on the bolt, and (2) that there has to be made a boring, a slot or the like either in the bolt or in the nut for applying the locking device. The only really practical solution of the problem is to secure the nut on the bolt by means of a pin of soft malleable metal inserted in borings or grooves which have been arranged in the bolt and in the nut. Such a locking device is simple to manufacture and simple in application and it does not cost much. Up to the present it has however been impossible to secure this pin in its position so that after a certain time it gets loose owing to the continuous vibrations and drops out of the nut even if it is wedge shaped.

It has been proposed to substitute for the pin of soft metal, a small piece of easily fusible solder located in a recess of the nut and to be melted after the nut has been screwed on so that the molten metal fills on the one hand the groove of the nut and on the other hand the spaces between the threads of the bolt. Although this locking device is very effective it is seldom used owing to the difficulties of application. It takes much time to melt the metal and if the nuts are screwed on the bolt from below, it often happens that the molten metal drops out of the nut.

The present invention relates to a locking device for screw nuts of that type in which a locking pin is used for keying the nut on the bolt, means being provided for securing this pin in the locking position.

In the accompanying drawings one form of execution of the nut lock is shown by way of example:—

Figure 1 shows in elevation partly in section a form of construction of the locking device with the auxiliary means for facilitating the driving in of the locking pins. Fig. 2 is a view similar to Fig. 1 showing the locking pins in locking position. Fig. 3 is a plan view and Fig. 4 is a plan view, the guide cylinder for the locking pins being removed.

The improved nut lock consists of a locking pin of very malleable metal, the length of which is preferably equal to about $1\frac{1}{3}$ the height of the nut so that, after the pin has been inserted and compressed, its metal can fill a recess provided between the nut and the bolt. The length of the pin in locking position is preferably equal to the height of the nut. For compressing the metal of the locking pin a punch is used. The pin presents in its locking position a laterally curved part $a$ which penetrates into the said recess of the nut or of the screw bolt, so that the nut is locked on the bolt against unscrewing from jolting or jarring, being free however for removal with a wrench by the application of a little more force to start it than is ordinarily required. The locking pin itself is securely fastened in its locking position.

Spiral grooves $g'$, $g^2$, $g^3$ are provided in the bolt. This arrangement offers the advantage over grooves parallel with the axis that the groove of the nut must always be opposite one of the grooves of the bolt provided the pitch of the spiral grooves of the bolt has been properly calculated. At the point of intersection of the two grooves there will always be formed a recess $h$ to be filled out by the metal of the locking pin when the same is compressed. The locking pin of soft malleable metal will bend at the point of intersection of the two grooves and fill the recess $h$.

In order to prevent the weakening of the threads of the bolt $c$ by the spiral grooves $g$ the pitch of said spirals must be as near the vertical as possible. The three grooves $g'$, $g^2$, $g^3$ are preferably arranged at uniform distances apart from each other, the pitch of the spiral being equal to three times the height of the nut $d$. A vertical groove $i$ of the nut therefore must always intersect with at least one of the three grooves of the bolt. If there are arranged two grooves $i$—$k$ in the nut the one opposite the other, the groove $k$ of the nut will intersect the groove $q^2$ of the bolt at the lower end of the nut if the groove $i$ of the nut intersects the groove $g'$ of the bolt near the upper end of the nut.

To facilitate the driving in of the pins $m$—$t$ which project from the upper end of the nut for about ⅓ of their length, it is preferable to use auxiliary means designed to prevent the damaging of the threads of the bolt. Such an auxiliary device consists of a short cylinder $o$ the inner boring of which is equal to the circumference of the screw bolt $c$. This cylinder $o$ has two vertical borings $p$—$q$ which correspond to the grooves $i$—$k$ of the nut $d$. Said vertical borings are separated from the inner boring of the cylinder by a thin portion $r$ of metal which forms a protecting sleeve for the upper end of the screw bolt, so that the threads of the bolt cannot be damaged by the punch $s$ used for forcing in the locking pins $m$—$t$. In the lower end of the cylinder $o$ a casing is provided which corresponds to the shape of the nut. For locking a nut on the bolt according to this invention the short cylinder $o$ is placed upon the nut after the same has been screwed on. The vertical borings $p$—$q$ of the cylinder $o$ must register with the grooves $i$—$k$ of the nut. The locking pins $m$—$t$ of soft very malleable metal are inserted in the borings $p$—$q$ of the cylinder and in the grooves $i$—$k$ of the nut respectively and forced in by means of a punch $s$ until their upper ends are flush with the upper surface of the nut. Fig. 1 shows the different parts in the positions before the forcing in of the locking pins, Fig. 2 showing the same in the positions after said pins have been forced in. As can be seen from Fig. 2, only one of the locking pins, in the present case the pin $m$ has bent so as to form the lateral projection $a$ filling the recess $h$ of the bolt. This locking pin has adopted the shape $m'$, the other locking pin having adopted the shape $t'$. Only one of the pins, $m'$, in the present case, acts as a key for the nut and is securely fixed in its position the other pin $t'$, having been merely compressed to a wedge shape, engaged only with the threads of the bolt. One of the two pins will always serve as a key but as one never can be sure whether both or only one of the pins will bend it is indispensable that both pins be driven in.

It is obvious that, instead of the cylinder $o$, any other equivalent auxiliary means can be used for facilitating the forcing in of the locking pins.

I claim:—

A nut-lock comprising a nut having diametrically opposite grooves parallel with the axis, a bolt having three equally distributed helical grooves with a pitch equal to three times the height of the nut and locking pins of soft malleable material driven into the grooves of the nut and adapted to be forced into the recesses formed at the points of intersection of the grooves of the nut and the bolt, and a cap to fit over the nut and both having apertures adapted to register with the grooves of the nut to facilitate the forcing of the pins into the recesses.

In witness whereof I have hereunto set my hand in the presence of two witnesses.

LOUIS ANTOINE GARCHEY.

Witnesses:
 DEAN B. MASON,
 ALFRED FREY.

Copies of this patent may be obtained for five cents each, by addressing the "Commissioner of Patents, Washington, D. C."